(12) United States Patent
Fullagar et al.

(10) Patent No.: US 10,685,759 B2
(45) Date of Patent: Jun. 16, 2020

(54) STATISTICAL ANALYSIS IN X-RAY IMAGING

(71) Applicant: FEI Company, Hillsboro, OR (US)

(72) Inventors: Wilfred Kelsham Fullagar, Weetangera (AU); Andrew Maurice Kingston, Kambah (AU); Glenn Robert Myers, Waramanga (AU); Mahsa Paziresh, Acton (AU); Trond Karsten Varslot, Vuku (NO)

(73) Assignee: FEI Company, Hillsboro, OR (US)

( * ) Notice: Subject to any disclaimer, the term of this patent is extended or adjusted under 35 U.S.C. 154(b) by 634 days.

(21) Appl. No.: 15/407,098

(22) Filed: Jan. 16, 2017

(65) Prior Publication Data
US 2018/0204647 A1   Jul. 19, 2018

(30) Foreign Application Priority Data

Jan. 16, 2017  (EP) ..................................... 17151666

(51) Int. Cl.
*G01N 23/00* (2006.01)
*G21K 7/00* (2006.01)
(Continued)

(52) U.S. Cl.
CPC ............. *G21K 7/00* (2013.01); *G01N 23/046* (2013.01); *G01N 23/2252* (2013.01); *H01J 2237/2807* (2013.01)

(58) Field of Classification Search
CPC .... G01N 23/046; G01N 23/2252; G21K 7/00; H01J 2237/2807
See application file for complete search history.

(56) References Cited

U.S. PATENT DOCUMENTS

| 6,507,633 B1 | 1/2003 | Elbakri et al. |
| 2008/0317200 A1* | 12/2008 | Lecomte ................ A61B 6/032 378/19 |

(Continued)

FOREIGN PATENT DOCUMENTS

WO    2016028654 A1    2/2016

OTHER PUBLICATIONS

"Average," Wikipedia, Retrieved from the Internet Apr. 4, 2017, https://en.wikipedia.org/wiki/Average, 8 pages.
(Continued)

*Primary Examiner* — Dani Fox

(57) ABSTRACT

A method of analyzing a specimen using X-rays, comprising the steps of:
  Irradiating the specimen with input X-rays;
  Using a detector to detect a flux of output X-rays emanating from the specimen in response to said irradiation,
which method further comprises the following steps:
  Using the detector to intercept at least a portion of said flux so as to produce a set $\{I_j\}$ of pixeled images $I_j$ of at least part of the specimen, whereby the cardinality of the set $\{I_j\}$ is M>1.
  For each pixel $p_i$ in each image $I_j$, determining the accumulated signal strength $S_{ij}$, thus producing an associated set of signal strengths $\{S_{ij}\}$.
  Using the set $\{S_{ij}\}$ to calculate the following values:
    A mean signal strength S per pixel position i;
    A variance $\sigma^2_S$ in S per pixel position i.
  Using these values S and $\sigma^2_S$ to produce a map of mean X-ray photon energy E per pixel.

20 Claims, 2 Drawing Sheets

Figure 1A:
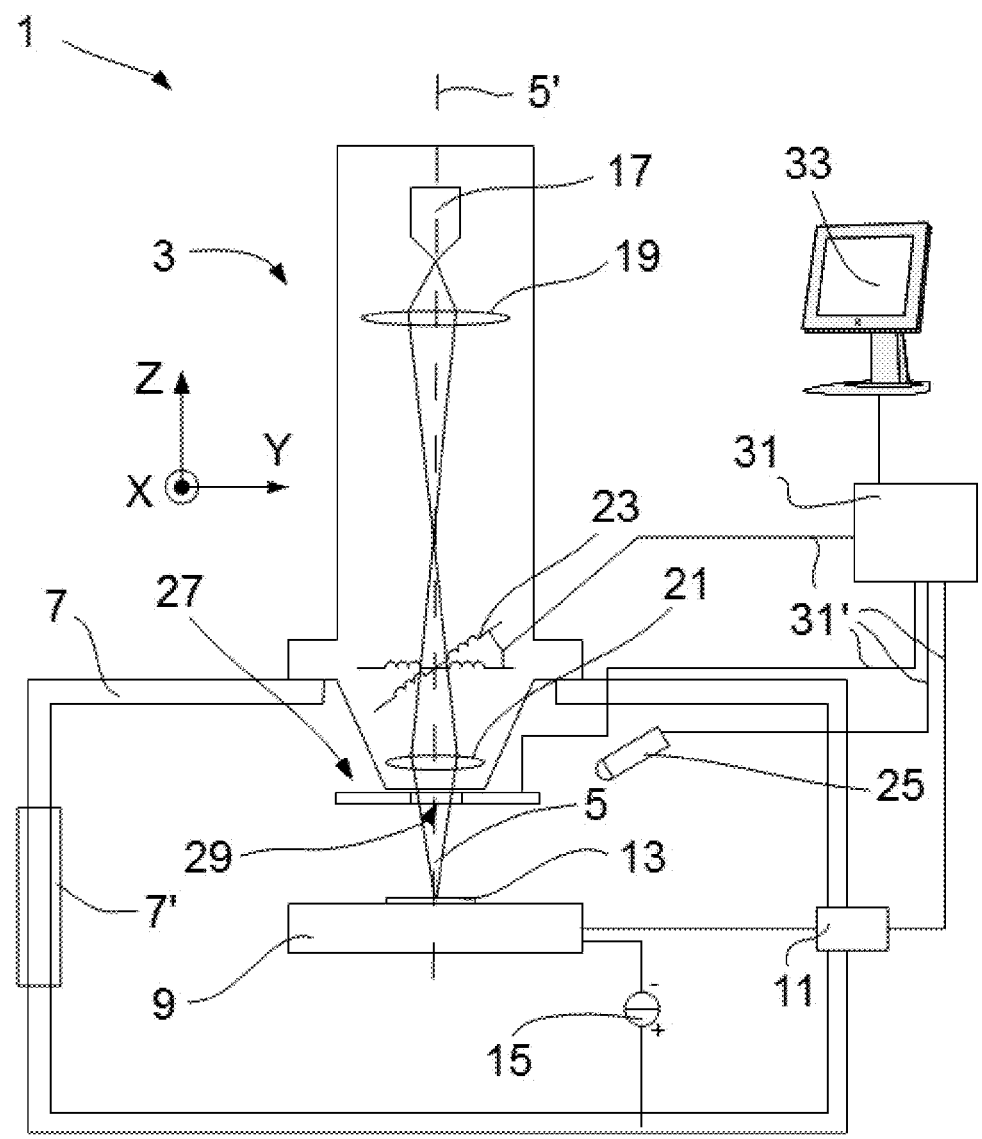

(51) Int. Cl.
*G01N 23/046* (2018.01)
*G01N 23/2252* (2018.01)

(56) References Cited

U.S. PATENT DOCUMENTS

| | | | |
|---|---|---|---|
| 2015/0155131 A1* | 6/2015 | Sluijterman | G01N 23/225 250/307 |
| 2016/0206269 A1* | 7/2016 | Jung | A61B 6/5258 |
| 2017/0052264 A1 | 2/2017 | Kingston et al. | |
| 2017/0059493 A1 | 3/2017 | Kingston et al. | |
| 2017/0061610 A1 | 3/2017 | Kingston et al. | |
| 2017/0276620 A1* | 9/2017 | Huang | G01N 23/046 |

OTHER PUBLICATIONS

"Cone Beam Computed Tomography", Wikipedia, Retrieved from the Internet Aug. 4, 2016, https://en.wikipedia.org/wiki/Cone_beam_computed_tomography, 8 pages.
"Electron Microscope", Wikipedia, Retrieved from the Internet Oct. 15, 2015, http://en.wikipedia.org/wiki/Electron_microscope, 11 pages.
"Focused Ion Beam", Wikipedia, Retrieved from the Internet Jul. 11, 2016, https://en.wikipedia.org/wiki/Focused_ion_beam, 7 pages.
"Nanotomography", Wikipedia, Retrieved from the Internet Aug. 4, 2016, from https://en.wikipedia,org/wiki/Nanotomography, 1 page.
"Scanning Electron Microscope", Wikipedia. Retrieved from the Internet Jul. 25, 2016, http://en.wikipedia.org/wiki/Scanning_electron_microscope, 23 pages.
"Scanning Helium Ion Microscope", Wikipedia, Retrieved from the Internet on Jul. 25, 2016, http://en.wikipedia.org/wiki/Scanning_Helium_Ion_Microscope, 2 pages.
"Scanning Transmission Electron Microscopy", Wikipedia, Retrieved from the Internet Jul. 25, 2016, http://en.wikipedia.org/wiki/Scanning_transmission_electron_microscopy, 5 pages.
"Spiral Computed Tomography", Wikipedia, Retrieved from the Internet Aug. 4, 2016, https://en.wikipedia.org/wiki/Spiral_computed_tomography, 2 pages.
"Standard Deviation," Wikipedia, Retrieved from the Internet Apr. 6, 2017, https://en.wikipedia.org/wiki/Standard_deviation, 19 pages.
"Transmission Electron Microscopy", Wikipedia, Retrieved from the Internet Jul. 25, 2016, http://en.wikipedia.org/wiki/Transmission_electron_microscopy, 23 pages.
"Variance," Wikipedia, Retrieved from the Internet Apr. 4, 2017, https://en.wikipedia.org/wiki/Variance, 15 pages.
"X-Ray Microtomography", Wikipedia, Retrieved from the Internet Aug. 4, 2016, https://en.wikipedia.org/wiki/X-ray_microtomography, 5 pages.
Barnes, R. et al., "Brownian Motion as a Natural Limit to all Measuring Processes," Rev. Mod. Phys., Jul. 1, 1934, pp. 162-192, vol. 6, Issue 3.
De Man, B. et al., "An Iterative Maximum-Likelihood Polychromatic Algorithm for CT," IEEE Transactions on Medical Imaging, Oct. 2001, pp. 999-1008, vol. 20, No. 10.
Escovitz, W.H. et al., "Scanning Transmission Ion Microscope with a Field Ion Source," Proc. Nat. Acad. Sci. USA, May 1975, pp. 1826-1828, vol. 72, No. 5.
Hull, A.W., et al., "Determination of Elementary Charge E from Measurements of Shot-Effect," Phys. Rev., Feb. 1, 1925, pp. 147-173, vol. 24, Issue 2.
Neuser, E., et al. "NanoCT® Visualizing internal 3D structures with submicrometer resolution", DIR 2007, 18 p, vol. 39 issue 41,International symposium on digital industrial radiology and computed tomography, France.
O'Sullivan, Joseph A., "Dual Energy CT Image Reconstruction Algorithms and Performance," AAPM, Jul. 28, 2009, 48 pages, Washington University in St. Louis, School of Engineering & Applied Science.
Rezvani, Nargol, "Reconstruction Algorithms in Computerized Tomography," CAIMS, 2009, 39 pages.
Uhlig, Jens et al., "Laser generated 300 keV electron beams from water," Laser and Particle Beams, Dec. 2011, pp. 415-424, vol. 29, Issue 4.
Varentsov, D. et al. "First biological images with high-energy proton microscopy", Physica Medica (2013), pp. 208-213, vol. 29.
Zhang, Ruoqiao, et al., "A Model-Based Iterative Algorithm for Dual-Energy X-Ray CT Reconstruction," The Second International Conference on Image Formation in X-Ray Computed Tomography, Jun. 2012, 5 pages.

\* cited by examiner

STATISTICAL ANALYSIS IN X-RAY IMAGING

The invention relates to a method of analyzing a specimen using X-rays, comprising the steps of:
  Irradiating the specimen with input X-rays;
  Using a detector to detect a flux of output X-rays emanating from the specimen in response to said irradiation.

The invention also relates to such a method when performed as part of an X-ray tomographic imaging procedure.

The invention particularly relates to such a method when performed in a Charged Particle Microscope.

In tomographic imaging (also referred to as Computed Tomography (CT)) as referred to above, the source and (diametrically opposed) detector are used to look through the specimen along different lines of sight, so as to acquire penetrative observations of the specimen from a variety of perspectives; these are then used as input to a mathematical procedure that produces a reconstructed "volume image" of (part of) the (interior of) the specimen. In order to achieve a series of different lines of sight as alluded to here, one can, for example, choose to:
  (i) Keep the source and detector static and move the specimen relative to them;
  (ii) Keep the specimen static and move the source relative to it. In this case, one can elect to:
    Move the detector in synchronization with the source; or
    Embody the detector as a (static) array of sub-detectors, with positions matched to correspond to the different positions to be assumed by the source.
  (iii) Use a static, distributed array of sources/detectors in conjunction with a static specimen—and invoke different source/detector pairs along different lines of sight, either serially or concurrently.
Regardless of whether the source or specimen is moved, it is possible to describe their relative motion using (for example) a specimen-centric coordinate system/reference frame. Typically, use is made of:
  A circular scan, in which the source follows a planar orbit about the specimen, and images are captured at a relatively high sampling rate (i.e. quasi-continuously) along this orbit. This type of scan can be applied in situations where only a relatively thin "slice" of a specimen has to be imaged. See, for example, the following reference:
en.wikipedia.org/wiki/Cone_beam_computed_tomography
  A helical scan, in which the source follows a coil-like (spiral) path about a (longitudinal) axis of the specimen, and images are again captured at a relatively high sampling rate (i.e. quasi-continuously) along this path. This type of scan can be applied in situations where a relatively elongated portion of a specimen has to be imaged. It is typically achieved by combining circular motion (e.g. of the source) and concurrent translational motion (e.g. of the specimen). See, for example, the following reference:
en.wikipedia.org/wiki/Spiral_computed_tomography
  A "matrix" of sampling points, which are not disposed along a curve, but are instead arranged in a substantially uniform distribution. Such a scenario is set forth in co-pending European Patent Application EP15181202.1/U.S. patent application Ser. No. 15/237, 309 (with the same assignee as the present application).
The beam of radiation that traverses the specimen can, for example, be regarded as being cone-like (thus yielding so-called cone beam tomography) or resembling a segment of a disc (thus yielding so-called fan beam tomography), depending on the geometry/shape that the detector "presents" to the source; alternatively, a parallel/collimated beam is also possible. The "line of sight" alluded to here can be regarded as corresponding to an "optical axis" along which the beam (from source through specimen to detector) propagates; it basically corresponds to the position of a central/median/core ray in that beam.

As regards the mathematical reconstruction technique used to produce a tomogram from a series of input images, use can be made of algorithms such as SIRT (Simultaneous Iterative Reconstruction Technique), ART (Algebraic Reconstruction Technique), DART (Discrete ART), SART (Simultaneous ART), MGIR (Multi-Grid Iterative Reconstruction), and many others: see, for example, the summary presented in the following publication:
www.cs.toronto.edu/-nrezvani/CAIMS2009.pdf Tomographic imaging as referred to here can be performed using a standalone apparatus, which is conventionally the case in medical imaging applications, for example, where the specimen (e.g. a human or animal) is macroscopic. Standalone CT tools are also available for performing so-called "micro CT", in which a micro-focused source is used to image microscopic specimens, e.g. in geology/petrology, biological tissue studies, etc. Continuing this drive toward ever-greater resolution, so-called "nano CT" instruments have also been developed; these may be standalone tools, but, for example, they may also be embodied as (add-on) modules for (a vacant vacuum/interface port of) a charged-particle microscope (CPM), in which case the CPM's charged-particle beam is used to irradiate a (block-like) metal target, causing production of the X-rays used to perform the desired tomography. More information on (some) of these topics can, for example, be gleaned from the following references:
en.wikipedia.org/wiki/X-ray_microtomography
en.wikipedia.org/wiki/Nanotomography
www.ndt.net/article/dir2007/papers/24.pdf It should be noted that, as referred to here in the context of a CPM, the phrase "charged particle" should be broadly construed as encompassing:
  Electrons, as in the case of a Transmission Electron Microscope (TEM), Scanning Electron Microscope (SEM), and Scanning Transmission Electron Microscope (STEM), for instance. See, for example, the following references:
  en.wikipedia.org/wiki/Electron_microscope
  en.wikipedia.org/wiki/Scanning_electron_microscope
  en.wikipedia.org/wiki/Transmission_electron_microscopy
  en.wikipedia.org/wiki/Scanning_transmission_electron_microscopy
    Ions, which may be positive (e.g. Ga or He ions) or negative. Such ion beams can be used for imaging purposes, but they are also often used for surface modification purposes, e.g. as in the case of Focused Ion Beam (FIB) milling, Ion-Beam-Induced Deposition (IBID), Ion-Beam-Induced Etching (IBIE), etc. See, for example, the following references:
  en.wikipedia.org/wiki/Focused_ion_beam
  en.wikipedia.org/wiki/Scanning_Helium_Ion_Microscope
  W. H. Escovitz, T. R. Fox and R. Levi-Setti, *Scanning Transmission Ion Microscope with a Field Ion Source*, Proc. Nat. Acad. Sci. USA 72(5), pp 1826-1828 (1975).
    Other charged particles, such as protons and positrons, for instance. See, for example, the following reference:
  www.ncbi.nlm.nih.gov/pubmed/22472444

It should also be noted that, in addition to imaging and/or surface modification, a charged particle beam in a CPM may also have other functionalities, such as performing spectroscopy, examining diffractograms, etc. The present invention will predominantly concern itself with tomography as applied to image microscopic specimens, including specimens that are microscopic sub-portions of larger/macroscopic objects; it therefore is primarily (though not necessarily) concerned with micro- and nano-CT techniques.

Although prior-art X-ray imaging techniques have produced agreeable results up to now, the current inventors have worked extensively to provide an innovative improvement to conventional approaches. The results of this endeavor are the subject of the current invention.

It is an object of the invention to provide an augmented method as set forth in the opening paragraph above. In particular, it is an object of the invention that such a method should have useful extra functionalities compared to prior-art techniques. Moreover, it is an object of the invention that such a method should lend itself to performing improved X-ray tomographic imaging.

These and other objects are achieved in a method as set forth in the opening paragraph above, which method is characterized in that it comprises the following steps:

Using the detector to intercept at least a portion of said flux so as to produce a set $\{I_j\}$ of pixeled images $I_j$ of at least part of the specimen, whereby the cardinality of the set $\{I_j\}$ is M>1.

For each pixel $p_i$ in each image $I_j$, determining the accumulated signal strength $S_{ij}$, thus producing an associated set of signal strengths $\{S_{ij}\}$.

Using the set $\{S_{ij}\}$ to calculate the following values:
A mean signal strength S per pixel position i;
A variance $\sigma^2_S$ in S per pixel position i.

Using these values S and $v^2_S$ to produce a map of mean X-ray photon energy E per pixel.

As regards the terminology used here, an image $I_j$ is considered to be "pixeled" if it can be sub-divided into a plurality of (real or imaginary) constitutive sub-regions—which may or may not correspond to detection pixels if a pixelated detector is used to produce the image in question. Moreover, the subscript i relating to pixel $p_i$ can be regarded as an enumerator rather than a coordinate: so, for example, in a square array of 100×100 pixels, i could be assigned a value of 1 for a first pixel at the top left of the array, and a value of 10000 for the last pixel at the bottom right of the array. The skilled artisan will fully grasp these points.

The current invention exploits inter alia the following insights:

The X-ray photon generation process in the specimen is statistical in nature, in that there is generally temporal variability in the numbers and/or energies of photons emanating from a given point in the specimen (for given irradiation parameters).

Conventional X-ray detection involves the registering of cumulative photon energy during a given temporal window (after which a refresh/reset will occur). In this context, a typical detector will, for example, not be able to discern whether a registered cumulative energy was due to a low flux of high-energy photons, or a high flux of low-energy photons, or a hybrid/mixture of these two scenarios.

The inventors realized that the statistical nature of the photon emission process set forth above can be exploited advantageously rather than being regarded as a nuisance. In this regard, they took the unusual step of recording multiple images of a specimen—not for conventional noise reduction purposes, but to act purely as a basis to perform statistical analysis. This might generally be considered as counter-productive, e.g. in terms of throughput penalty and generally increased radiation dose to the specimen. However, by examining these various images on a pixel-by-pixel basis, and mathematically processing them, the fact that the inventors had recorded multiple (temporally disparate) images allowed statistical means/averages (S) and variances ($\sigma^2_S$) per pixel to be distilled from the data. This effectively amounted to a deconvolution process, whereby two different parameters could be separated from one another in data that was initially "muddled" in nature. By considering the photon production/imaging process in more detail, the inventors realized that the distilled values of S and $\sigma^2_S$ scaled in different ways with the energy (E) and number (N) of photons arriving at the detector, thus allowing an "E-map"—and, if desired, also "N-map"—of the specimen to be produced. This can, for example, be explained as follows:

The quantity S demonstrates functional behavior that can be expressed as follows:

$$S \sim E\, N_o \eta \quad (1)$$

whereby:

$N_o$ describes the average number of photons in the input beam, and demonstrates variations according to a Poisson process.

η is a detection probability coefficient.

E describes the average energy of the detected photons resulting from the impact of a single input photon.

The combined result is a Poisson process with an average value $N = N_o\, \eta$, being a measure of the number of detected photons per input photon. One can thus write:

$$S \sim E\, N \quad (1a)$$

The variance $\sigma^2_S$ in S demonstrates functional behavior that can be expressed as follows:

$$\sigma^2_S \sim E^2 N \quad (2)$$

Combining expressions (1a) and (2), it follows that:

$$E = f(S, \sigma^2_S) \quad (3)$$

$$N = g(S^2, \sigma^2_S) \quad (4)$$

where f and g are functions. For example:

$$E \sim \sigma^2_S / S \quad (3a)$$

$$N \sim S^2 / \sigma^2_S \quad (4a)$$

Since these values are calculated per pixel, a plot of their values per pixel respectively renders an E-map (and an N-map) of the specimen, as well as a mean intensity map (comprising conventional X-ray projection data).

The mean intensity depends on the path length travelled through a particular material, but also upon the composition of that material (the X-ray attenuation coefficient). From this data alone, it is not possible to distinguish geometrical information from compositional information (e.g. regions comprising different contaminants and/or dopants, different densities, general transitions from one material to another, etc.). The X-ray attenuation coefficient, in turn, typically depends nonlinearly on the X-ray photon energy. The present invention provides a means to separate two different types of information from the same imagery, rather than having to put up with some forced hybrid/mix of the two. The ability to distill out the E-map becomes particularly interesting, because it allows the extraction of rudimentary compositional information without having to resort to (for example) X-ray spectroscopy (EDS).

The skilled artisan will be well able to quantify S and $\sigma^2_S$ from analysis of the set $\{S_j\}$, e.g. using relatively straightforward software to automatically analyze the data $\{S_{ij}\}$ and determine attendant averaged amplitudes and spreads per pixel. In so doing, he has the freedom to choose from various estimators for the required mean and variance; for example, in the case of the quantity S, the employed mean may be a simple arithmetic average (sum of values divided by number of values), or another type of estimator. Similarly, relatively simple software will be able to automatically perform calculations such as those set forth in equations (3a) and (4a) above, for example. The software in question may be executed with the aid of a controller, such as an electronic microprocessor, which may also be programmed to automatically collect the dataset $\{I_j\}$, render the E/N maps on a display device, etc. Inter alia in the context of the elucidation just given, reference is made to the following explanatory Wikipedia links, for general information purposes:
en.wikipedia.org/wiki/Average
en.wikipedia.org/wiki/Variance
en.wikipedia.org/wiki/Standard_deviation Needless to say, the accuracy of the procedure set forth in the previous paragraph will depend inter alia on the number M of accumulated images $I_j$, i.e. on the cardinality M of the set $\{I_j\}$. This is a matter of choice, and the skilled artisan will be able to decide how to manage the tradeoff between greater accuracy (in the calculated values of S and $\sigma_S$) on the one hand, and the competing issue of throughput on the other hand. Another issue that may need to be considered is the total radiation dose delivered to the specimen, and an acceptable upper limit in this regard may place a restriction on the value of M. However, the inventors have observed that, because the current invention is predominantly interested in the differences between images in the set $\{I_j\}$ more than on the direct content of the images $I_j$ themselves, there are situations in which it is possible to lower the dose per image so as to (partially) compensate for the multiplicity of images acquired thus decreasing the cumulative radiation dose for the whole image set $\{I_j\}$. Moreover, in calculating values of S and $\sigma^2_S$ from analysis of the set $\{S_{ij}\}$, intelligent algorithms can be used to produce more refined values of S and $\sigma^2_S$ from smaller data sets, e.g. by extrapolating/interpolating data from a cluster of ancillary (neighboring) pixels adjacent to any given subject pixel; in this way, one can suffice with a smaller value of M to start off with. By way of non-limiting example, provided for general guidance purposes only, the inventors have achieved satisfactory results with the current invention using a value of M in the range 50-300, for instance.

In an advantageous embodiment, the inventive method is performed as part of an X-ray tomographic imaging procedure. As set forth above, tomographic reconstruction synthesizes a series of two-dimensional (2D) images taken along different lines of sight into a three-dimensional (3D) image. The present invention can be applied for each of (a selected subset of) these individual lines of sight $L_K$, whereby the value of the abovementioned cardinality M may be the same or different for different lines of sight. Since the process of tomographic reconstruction is effectively a process of mathematical deconvolution/disentanglement, and since the invention already produces a certain information disentanglement along each line of sight (the aforementioned separation of E (compositional) and N (topographical) information), use of the invention to input statistically processed 2D images into a 3D tomographic reconstruction will expedite/enrich the reconstruction process. In particular, use of the invention in conjunction with a tomographic imaging procedure allows the following:

(I) Beam Hardening correction:

Beam Hardening (BH) is a phenomenon whereby, in a polychromatic beam of X-rays, lower-energy photons tend to be selectively "filtered" from the beam when it passes through a material, thereby altering the energy distribution in the beam. This selective removal of photons is due to various (energy-specific) interactions in the material—such as the photoelectric effect and Compton scattering—and generally involves some form of interplay between the photons in the beam and one or more of atoms, ions, phonons and plasmons in the material. This phenomenon tends to produce unwanted visual artifacts in the reconstructed tomogram, particularly along interfaces between structures/materials in the imaged specimen. The current invention can address this issue by using the above-mentioned E-map as a basis for estimating the energy shift per ray direction through the specimen. See, for example, Embodiment 2 below.

(II) Determination/estimation of at least one of the specimen's material density (ρ) and atomic number (Z) per voxel.

As is set forth in more detail in Embodiment 2 below, for example, Beam Hardening effects are closely associated with ρ and Z. Using an attenuation model in conjunction with the present invention, it is possible to derive values for ρ and/or Z.

It should be noted that, according to the current invention, there are different manners in which the set $\{I_j\}$ can be produced. For example:

(i) In one approach, the set $\{I_j\}$ is produced by iteratively repeating (with a total of M iterations) a procedure in which an entire $n^{th}$ image $I_n$ is captured before proceeding to capture an entire $(n+1)^{th}$ image $I_{n+1}$. In this case, the set $\{I_j\}$ is basically a stack of M individual pre-assembled images $I_j$.

Such an approach can, for example, be enacted using detection scheme (a) or (b) below.

(ii) In an alternative approach, the set $\{I_j\}$ is produced by iteratively repeating a procedure in which, at an $n^{th}$ pixel position, a plurality M of different detector samples is collected before proceeding to an $(n+1)^{th}$ pixel position. In this case, the set $\{I_j\}$ is basically assembled by juxtaposing pixel stacks on a two-dimensional floor area—somewhat like mini-skyscrapers with M floors arranged side-by-side; a given image $I_n$ is then the cumulative floor area made up of all $n^{th}$ floors of the individual skyscrapers in question. So, in this case, individual images $I_j$ can be regarded as post-assembled rather than pre-assembled. In this scenario, whether or not one actually takes the trouble to explicitly "resolve" (assemble) individual images $I_j$ out of the "unresolved" set $\{I_j\}$ is not of particular relevance to the current invention: the main object is to accrue the dataset $\{S_{ij}\}$ and the associated values of S and $\sigma^2_S$ via the set $\{I_j\}$ (resolved or not). Such an approach can, for example, be enacted using detection scheme (a) below.

(iii) If desired, one can conceive various hybrids/mixes of approaches (i) and (ii).

As regards the detection schemes alluded to above, the following possibilities can be considered:
(a) Scan-based detection, whereby:
The detector is a single-segment detector (for example);
An image is produced by scanning the beam of input X-rays relative to the specimen.
In this scenario, a narrow beam of input X-rays irradiates only a small region of the specimen at any given time, and the employed detector intercepts (a portion of) the flux of X-rays emerging from the irradiated region in question, so as to create a component image sub-section. This process is repeated at successive regions on the specimen (following a scan path), and a full image can then be assembled by "tiling" the obtained component image sub-sections together. An analogous procedure is commonly employed in a SEM, for example.
(b) "Full-field" detection. Here, the full specimen (or a relatively large area thereof) is irradiated using a relatively broad beam of input X-rays, and a pixelated detector (such as a CCD or CMOS array, for example) is used to capture X-rays emanating from the whole irradiated zone on the specimen, leading to outright formation of a two-dimensional image. An analogous procedure is commonly employed in a TEM, for example.
(c) If desired, one can conceive various hybrids/mixes of schemes (a) and (b).

The skilled artisan will be able to grasp these points and choose for himself the manner in which he wishes to accumulate the set $\{S_{ij}\}$ via the set $\{I_j\}$.

The invention will now be elucidated in more detail on the basis of exemplary embodiments and the accompanying schematic drawings, in which:

FIG. 1A renders an elevational view of a charged-particle microscope that can be used in conjunction with the current invention.

Figure 1B:
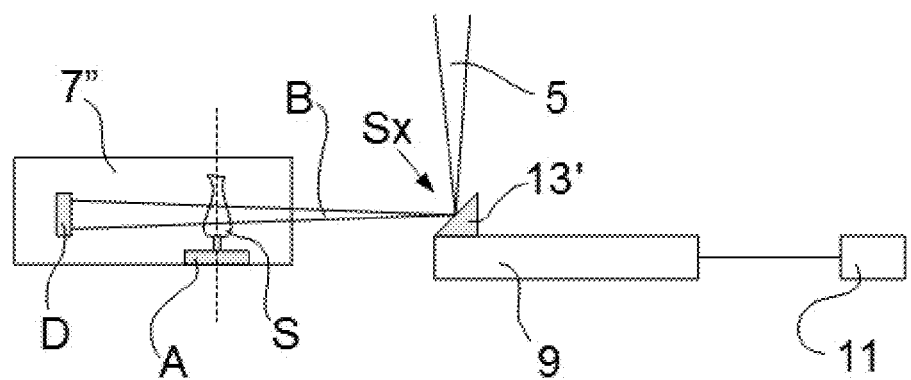

FIG. 1B illustrates an in situ CT module that can be used in a CPM.

In the FIGURES, where pertinent, corresponding parts may be indicated using corresponding reference symbols. It should be noted that, in general, the Figures are not to scale.

Embodiment 1

FIG. 1A is a highly schematic depiction of an embodiment of a CPM 1 that can be used in conjunction with the present invention; more specifically, it shows an embodiment of a SEM—though, in the present context, it could just as validly be an ion-based microscope, for example, or a TEM, for instance. The microscope 1 comprises a particle-optical column/illuminator 3, which produces a beam 5 of charged particles (in this case, an electron beam) that propagates along a particle-optical axis 5'. The particle-optical column 3 is mounted on a vacuum chamber 7, which comprises a specimen holder 9 and associated stage/actuator 11 for holding/positioning a specimen 13. The vacuum chamber 7 is evacuated using vacuum pumps (not depicted). With the aid of voltage source 15, the specimen holder 9, or at least the specimen 13, may, if desired, be biased (floated) to an electrical potential with respect to ground.

The particle-optical column 3 comprises an electron source 17 (such as a Schottky emitter), (electrostatic/magnetic) lenses 19, 21 (in general, more complex in structure than the schematic depiction here) to focus the electron beam 5 onto the specimen 13, and a deflection unit 23 to perform beam deflection/scanning of the beam 5. When the beam 5 impinges on/is scanned across the specimen 13, it will precipitate emission of various types of "stimulated" radiation, such as backscattered electrons, secondary electrons, X-rays and cathodoluminescence (infra-red, visible and/or ultra-violet photons); one or more of these radiation types can then be sensed/recorded using one or more detectors, which may form an image, spectrum, diffractogram, etc., typically by assembling a "map" (or "matrix") of detector output as a function of scan position on the specimen. The present FIGURE shows two such detectors, 25, 27, which may, for example, be embodied as follows:
Detector 25 may, for example, be an electron detector (such as an Solid State Photo-Multiplier or Everhart-Thornley detector), a (cathodoluminescence) light detector (such as a photodiode), or an X-ray detector (such as an SDD or Si(Li) sensor).
Detector 27 is a segmented electron detector, comprising a plurality of independent detection segments (e.g. quadrants) disposed about a central aperture 29 (allowing passage of the beam 5). Such a detector can, for example, be used to investigate (the angular dependence of) a flux of output (secondary or backscattered) electrons emerging from the specimen 13.
These are just examples, and the skilled artisan will understand that other detector types, numbers and geometries/configurations are possible.

The microscope 1 further comprises a controller/computer processing unit 31 for controlling inter alia the lenses 19 and 21, the deflection unit 23, and detectors 25, 27, and displaying information gathered from the detectors 25, 27 on a display unit 33 (such as a flat panel display); such control occurs via control lines (buses) 31'. The controller 31 (or another controller) can additionally be used to perform various mathematical processing, such as combining, integrating, subtracting, false colouring, edge enhancing, and other processing known to the skilled artisan. In addition, automated recognition processes (e.g. as used for particle analysis) may be included in such processing.

Also depicted is a vacuum port 7', which may be opened so as to introduce/remove items (components, specimens) to/from the interior of vacuum chamber 7, or onto which, for example, an ancillary device/module may be mounted (not depicted). A microscope 1 may comprise a plurality of such ports 7', if desired.

In the context of performing X-ray tomography, the microscope 1 can also comprise an in situ CT module 7" as shown in FIG. 1B. In this FIGURE, the CPM's specimen holder 9 has been provided with a standalone metal target 13', which is positioned (using actuator 11) so that electron beam 5 impinges upon it, thus producing X-rays in a variety of directions. The FIGURE shows a beam B of such X-rays that propagate to one side from target 13' (effective source Sx) into module 7", where they pass through a specimen S and impinge upon a detector D. The specimen S is mounted on a stage apparatus A that allows the specimen S to be positioned/moved (typically translated and rotated) relative to the source Sx. Such a CT module 7" may be permanently present (ab initio) in the vacuum enclosure 7, or it may be an add-on module that can be mounted (post-manufacture of the CPM 1) on/within a spare vacuum port 7', for example.

In the specific context of the current invention, the controller 31 and/or a dedicated separate processing unit (not shown) can be used to perform the following actions:
Using detector D to produce a set $\{I_j\}$ of pixeled X-ray images $I_j$ of at least part of the specimen S, whereby the cardinality of the set $\{I_j\}$ is M>1. As set forth above, this may, for example be done:
  On a pixel-by-pixel basis, whereby M samples of the X-ray flux are measured in succession at a given position on the specimen S before moving the beam B onto a next position on the specimen S; or
  On an image-by-image basis, whereby an entire scan of (said part of) the specimen S is made by beam B, leading to creation of a whole image $I_o$ and this procedure is performed a total of M times in succession.
For each pixel $p_i$ in each image $I_j$, determining the accumulated signal strength $S_{ij}$, thus producing an associated set of signal strengths $\{S_{ij}\}$.
Using the set $\{S_{ij}\}$ to calculate the following values:
  An average signal strength S per pixel position i;
  A variance $\sigma^2_S$ in S per pixel position i.
Using these values S and $\sigma^2_S$ (as input to equation (3a), for example), to produce a map of mean X-ray photon energy E per pixel.

It should be noted that many refinements and alternatives of such a set-up will be known to the skilled artisan, including, but not limited to:
  The use of dual beams—for example an electron beam 5 for imaging and an ion beam for machining (or, in some cases, imaging) the specimen S;
  The use of a controlled environment at the specimen S—for example, maintaining a pressure of several mbar (as used in a so-called Environmental SEM) or by admitting gases, such as etching or precursor gases, etc.

Embodiment 2

An example will now be given as to how the present invention can be used to perform a correction for Beam Hardening effects:
(A) Perform an averaging operation on the set $\{I_j\}$ of pixeled images to produce a "mean image".
(B) Compile an E-map as set forth above.
(C) From the mean image resulting from step (A), construct a "normal" tomogram. This tomogram will be subject to Beam Hardening effects.
(D) From the E-map resulting from step (B), construct an "energy-shift" tomogram $T_A$. This tomogram effectively indicates how much the mean energy will shift per ray going through a particular point.
(E) Compute a mean X-ray energy $E_m$ along a given ray direction (s) by calculating an integral using source mean energy $E_o$ as an initial condition:

$$E_m = E_o + \int T_{66} ds$$

(F) A generally accepted model for attenuation (p) is the Alvarez model:

$$\mu(E) \sim K_1 \rho Z^3/E^3 + K_2 \rho \quad (5)$$

in which:
  $K_1$ and $K_2$ are material constants, $\rho$ is material density, Z denotes atomic number, and E is energy;
  Certain simplifications have been introduced, such as assuming that the so-called Klein-Nishina function is constant in the energy band in question (reasonable in a typical micro-CT energy range, say below 150 keV).
Constants $K_1$ and $K_2$ can be estimated for a given class of materials based on tabulated values for attenuation versus energy, but, as will transpire below, this is not necessary in the current context. It is seen from this relation that:
  For high energies, attenuation is independent of energy;
  For low energies, attenuation is approximately proportional to $1/E^3$.
If one assumes the same model to hold for mean energy $E_m$ (see point (E) above), and if one concentrates on a low-energy band (e.g. below 80 keV) in which one can assume the second term to be approximately zero, then one can derive a corrected X-ray attenuation expression:

$$\mu(E_m) = \mu(E)(E_m/E_o)^3.$$

This allows construction of a set of simulated projections in which, for each ray direction, one uses an X-ray attenuation map initially reconstructed from measured projection data, but subsequently corrected using the inventive E-map along the ray direction in question. These simulated projections can then be used in a normal tomographic reconstruction to obtain a tomogram with greatly reduced (ideally zero) Beam Hardening effects.
(G) If desired, at least one of Z and p can be derived from expression (5), using values of $K_1$, $K_2$ obtained from a calibration series and/or tabulated references.

Embodiment 3

As an alternative to the approach set forth in Embodiment 2, one can consider the inventive E-map as an energy-weighted spectrum (more strictly: $\sigma^2_S$ can be regarded as an energy-weighted image, with $E \sim \sigma^2_S S$). In conjunction with one of the images in the set $\{I_j\}$ (or a "mean image" as referred to in (A) above), one now has two inputs into a dual-energy reconstruction algorithm. In this case, the E-map is effectively a normal image that has been skewed to higher energies. Some additional information on dual-energy reconstruction algorithms can, for example, be gleaned from the following sources:
www.aapm.org/meetings/amos2/pdf/42-11941-4304-839.pdf
engineering.purdue.edu/-bouman/publications/pdf/CT-2012-Ruoqiao.pdf

The invention claimed is:
1. A method of analyzing a specimen using X-rays:
  irradiating the specimen with input X-rays;
  using a detector to detect a flux of output X-rays emanating from the specimen in response to said irradiation;
  using the detector to intercept at least a portion of said flux so as to produce a set $\{I_j\}$ of pixeled images $I_j$ of at least part of the specimen, whereby the cardinality of the set $\{I_j\}$ is M>1;
  for each pixel pi in each image $I_j$, determining the accumulated signal strength $S_{ij}$, thus producing an associated set of signal strengths $\{S_{ij}\}$;
  using the set $\{S_{ij}\}$ to calculate the following values:
    a mean signal strength S per pixel position i; and
    a variance $\sigma_{2s}$ in S per pixel position i; and
  using these values S and $\sigma^2_S$ to produce a map of mean X-ray photon energy E per pixel.
2. A method according to claim 1, wherein said map is produced with the aid of a functional dependence $E \sim \sigma^2_S/S$ per pixel position i.

3. A method according to claim 1, wherein the set $\{I_j\}$ is produced by iteratively repeating a procedure whereby an entire $n^{th}$ image $I_n$ is captured before proceeding to capture an entire $(n+1)^{th}$ image $I_{n+1}$.

4. A method according to claim 1, wherein the set $\{I_j\}$ is produced by iteratively repeating a procedure whereby, at an $n^{th}$ pixel position, a plurality M of different detector samples is collected before proceeding to an $(n+1)^{th}$ pixel position.

5. A method according to claim 1, performed as part of an X-ray tomographic imaging procedure.

6. A method according to claim 5, wherein said value of E is used to perform a Beam Hardening correction.

7. A method according to claim 5, wherein said value of E is used to derive values of at least one of the specimen's material density and atomic number per voxel.

8. A charged-particle microscope comprising:
- a charged-particle source, for producing an irradiating beam of charged particles;
- a particle-optical column, for directing said beam onto a target so as to produce an X-ray beam;
- a specimen holder, for holding a specimen to be irradiated by said X-ray beam; and
- a detector, for detecting a flux of output X-rays emanating from the specimen in response to said irradiation,
- wherein the charged-particle microscope further comprises a controller that is configured to perform the following actions:
  - using said detector to produce a set $\{I_j\}$ of pixeled images $I_j$ of at least part of the specimen, whereby the cardinality of the set $\{I_j\}$ is M>1;
  - for each pixel $p_i$ in each image determining the accumulated signal strength $S_{ij}$, thus producing an associated set of signal strengths $\{S_{ij}\}$;
  - using the set $\{S_{ij}\}$ to calculate the following values:
    - a mean signal strength S per pixel position i; and
    - a variance $\sigma^2_S$ in S per pixel position i; and
  - using these values S and $\sigma^2_S$ to produce a map of mean X-ray photon energy E per pixel.

9. A method according to claim 2, wherein the set $\{I_j\}$ is produced by iteratively repeating a procedure whereby an entire $n^{th}$ image $I_n$ is captured before proceeding to capture an entire $(n+1)^{th}$ image $I_{n+1}$.

10. A method according to claim 2, wherein the set $\{I_j\}$ is produced by iteratively repeating a procedure whereby, at an $n^{th}$ pixel position, a plurality M of different detector samples is collected before proceeding to an $(n+1)^{th}$ pixel position.

11. A method according to claim 2, performed as part of an X-ray tomographic imaging procedure.

12. A method according to claim 3, performed as part of an X-ray tomographic imaging procedure.

13. A method according to claim 4, performed as part of an X-ray tomographic imaging procedure.

14. A method according to claim 11, wherein said value of E is used to perform a Beam Hardening correction.

15. A method according to claim 12, wherein said value of E is used to perform a Beam Hardening correction.

16. A method according to claim 13, wherein said value of E is used to perform a Beam Hardening correction.

17. A method according to claim 6, wherein said value of E is used to derive values of at least one of the specimen's material density and atomic number per voxel.

18. A method according to claim 14, wherein said value of E is used to derive values of at least one of the specimen's material density and atomic number per voxel.

19. A method according to claim 15, wherein said value of E is used to derive values of at least one of the specimen's material density and atomic number per voxel.

20. A method according to claim 16, wherein said value of E is used to derive values of at least one of the specimen's material density.

* * * * *